United States Patent [19]
Schreiter

[11] Patent Number: 5,938,731
[45] Date of Patent: Aug. 17, 1999

[54] EXCHANGING SYNCHRONOUS DATA LINK CONTROL (SDLC) FRAMES TO ADJUST SPEED OF DATA TRANSFER BETWEEN A CLIENT AND SERVER

[75] Inventor: Mark Eugene Schreiter, Rochester, Minn.

[73] Assignee: International Business Machines Corporation, Armonk, N.Y.

[21] Appl. No.: 08/880,777

[22] Filed: Jun. 23, 1997

[51] Int. Cl.[6] .................................................. H04L 12/00
[52] U.S. Cl. .......................................... 709/227; 709/233
[58] Field of Search ........................ 395/200.33, 200.57, 395/200.58, 200.63, 880

[56] References Cited

U.S. PATENT DOCUMENTS

| | | | |
|---|---|---|---|
| 3,676,858 | 7/1972 | Finch et al. | 340/172.5 |
| 5,204,949 | 4/1993 | Yasue et al. | 395/200 |
| 5,237,676 | 8/1993 | Arimilli et al. | 395/550 |
| 5,408,609 | 4/1995 | Malgogne et al. | 395/200 |
| 5,442,750 | 8/1995 | Harriman, Jr. et al. | 395/200 |
| 5,561,771 | 10/1996 | Harriman, Jr. et al. | 395/200.13 |
| 5,627,970 | 5/1997 | Keshav | 395/200.13 |
| 5,812,786 | 9/1998 | Sezholtz et al. | 395/200.63 |
| 5,819,048 | 10/1998 | Okazaki et al. | 395/200.63 |

OTHER PUBLICATIONS

IBM Publication (SDLC Concepts), Appendix D. Asynchronous SDLC, pp. 69–75.

IBM Publication (SDLC Concepts), Automatic Calling and/or Answering Equipment on the General Switched Telephone Network (GSTN) Using the 100–Series Interchange Circuits, pp. 126–142.

Network Access Protocols, pp. 410–419.

*Primary Examiner*—Lance Leonard Barry
*Attorney, Agent, or Firm*—Jack V. Musgrove; Andrew J. Dillon

[57] ABSTRACT

A method of automatically adjusting the line speed for communication between a client having data communications equipment (DCE) and a server having data terminal equipment (DTE). A first connection is established between the client and the server at a first speed, and the client sends a first synchronous data link control (SDLC) frame that identifies a requested speed. The server than sends a second SDLC frame in response to the first SDLC frame, identifying a second speed, wherein the second speed is the smaller of the requested speed and a predetermined (maximum) speed. If the client determines to communicate at the second speed, it drops the first connection, establishes a second connection at the second speed, and sends a third SDLC frame at the second speed; the server then sends a fourth SDLC frame in response to the third SDLC frame at the second speed, to confirm the connection, and data transmission follows. If either the client or the server does not receive an SDLC frame at the second speed within a predetermined time, it drops the second connection and establishes a third connection using the first speed.

14 Claims, 2 Drawing Sheets

EXCHANGING SYNCHRONOUS DATA LINK CONTROL (SDLC) FRAMES TO ADJUST SPEED OF DATA TRANSFER BETWEEN A CLIENT AND SERVER

BACKGROUND OF THE INVENTION

1. Field of the Invention

The present invention generally relates to computer systems, and more particularly to a method of automatically adjusting the line speed for communication between a client and a server.

2. Description of the Related Art

Computers are often required to communicate with each other, such as when a client (workstation) desires to connect to a server (node). This communication may be established to allow the server to provide information directly to the client, or to allow the server to act as an intermediary in passing information to the client from a larger network of servers. The client includes data communications equipment (DCE, also referred to as data circuit terminating equipment) which interfaces with data terminal equipment (DTE) of the server, to form a channel or transmission circuit. Different protocols are used in the prior art to establish and maintain communications between the DCE and the DTE. Protocols are often optimized based on various criteria, such as the nature of the data being transmitted. Most protocols provide the same basic functionality, by using common features including framing, error detection, error recovery, polling, addressing, and flow control.

Data communications between a client and server are either synchronous or asynchronous. With asynchronous transmission, time intervals between transmitted characters may be of unequal length, and each transmitted character is sent separately. Transmission is controlled by start and stop bits at the beginning and end of each character so that the character can be sent at an arbitrary time, and separate from any other character. With synchronous transmission, characters are sent at a fixed rate, in blocks, with the transmitting and receiving devices synchronized. Synchronization is achieved by sending a clock signal along with the data, and by sending special bit patterns to denote the start of each block.

Protocols generally fall into one of three categories, bit-oriented (synchronous), asynchronous character-oriented, or synchronous character-oriented. Examples of bit-oriented protocols include X.25 (using packets over public data networks), systems network architecture (SNA) developed by International Business Machines Corp. (IBM), and integrated services digital network (ISDN). An example of an asynchronous character-oriented protocol is the VT-Series developed by Digital Equipment Corp. Examples of synchronous character-oriented protocols include DDCMP (digital data communication message protocol), and BiSync (binary synchronous communications, developed by International Business Machines Corp.). The BiSync protocol provides rules for the synchronous transmission of binary data as a serial stream of binary digits. Synchronization is established using bit patterns or control characters.

Another bit-oriented protocol which is generally more efficient than BiSync is synchronous data link control (SDLC), used in SNA environments. SDLC can control an individual channel and still accommodate other network requirements. SDLC uses a variety of patterns to flag the beginning and end of a frame or packet. Different bit patterns are used to convey address, control and header fields which accompany the transmission and guide the frame to its destination.

A hybrid between the SDLC and the ASYNC protocols is called SDLC over ASYNC. In this environment, the 3 major hardware rules of the SDLC protocol (that are implemented in hardware and software on an SDLC connection) are applied via software to data being sent over an asynchronous link.

The 3 protocol rules are:

a) each block of data begins and ends with a block-delimiting character (a "7E"X).

b) each block of data has a CRC (cyclic redundancy check) associated with it to guarantee data integrity for that block.

c) each information block has a sequence counter in it that ensures frames are received in the correct order at the receiver.

All blocks of data on an SDLC over ASYNC link contain the same elements found in a block of data on a real synchronous connection:

starting and ending flags;

SDLC station address;

SDLC control byte (to indicate the type of frame);

CRC to verify data integrity.

SDLC over ASYNC is intended to provide the benefits of SDLC, including interconnection with other SNA-SNA nodes, through an inexpensive medium (an ASYNC port is standard equipment on many personal computers and network stations).

One problem that is not addressed in these prior art protocols relates to the speed of the communications. For example, a conventional console for an AS/400 computer (sold by IBM) having a multi-function input/output processor supports a personal computer (PC) client that communicates with the AS/400 server at a fixed baud rate of 9600 bits per second (bps). This value was hard-wired into both the PC and the AS/400. Modern servers can now, however, communicate easily at significantly faster speeds up to, e.g., 115 kilobits per second (kbps). Similarly, PCs are now being manufactured with greatly increased CPU speeds and most, if not all, have a high-speed universal asynchronous receiver/transmitter (UART), allowing baud rates of, e.g., 115 kbps also.

With such advances in hardware, software should be capable of increasing performance and line speed to take advantage of the hardware but, presently, there is no way to accomplish this without some type of manual configuration change on the server and the client. While it might be possible to use software to automatically detect the line speed for certain input/output processors (IOPs), similar to the detection performed with a conventional AS/400 ASCII work station controller, this approach has limitations (the algorithm only supports a limited number of detectable BAUD Rates), and the algorithm will not work in some IOPs, where the low-level code cannot effectuate such auto-sensing through the chip.

It would, therefore, be desirable to provide a flexible method which allows DCE to communicate at a speed higher than a default speed of DTE. It would be further advantageous if the method were sensitive to clients and servers that have not implemented any special functionality regarding the communications speed.

SUMMARY OF THE INVENTION

It is therefore one object of the present invention to provide a protocol for establishing communication between data communications equipment (DCE) and data terminal equipment (DTE).

It is another object of the present invention to provide such a protocol that flexibly allows the DCE and DTE to communicate at different speeds.

It is yet another object of the present invention to provide such a protocol that can be implemented on DTE even if the DCE might be limited to only a single communications speed.

The foregoing objects are achieved in a method of automatically adjusting the line speed for communication between a client and a server, generally comprising the steps of establishing a first connection between the client and the server at a first speed, sending at the first speed, from the client to the server, a first synchronous data link control (SDLC) frame that identifies a requested speed, and sending at the first speed, from the server to the client, a second SDLC frame in response to the first SDLC frame, the second SDLC frame identifying a second speed, wherein the second speed is the smaller of the requested speed and a predetermined speed. If the requested speed is the same as or less than the predetermined speed, then the second SDLC frame is simply an acknowledgement of the requested speed. The client determines whether to communicate at the first (default) speed or the second speed and, if the client determines to communicate at the second speed, it drops the first connection, establishes a second connection at the second speed, and sends a third SDLC frame at the second speed; the server then sends to the client a fourth SDLC frame in response to the third SDLC frame at the second speed. If the server does not receive the third SDLC frame within a predetermined time, it drops the second connection and establishes a third connection using the first speed. Similarly, if the client does not receive the fourth SDLC frame within a predetermined time, it drops the second connection and establishes a third connection using the first speed. The client and server can then re-negotiate the communications speed, or just use the first speed for data transmission. A counter may be used to indicate the number of connection attempts, such that the system may attempt to negotiate a higher speed a certain number of times before giving up and using the default speed. The server can easily be made to support clients that have not implemented this automatic adjustment process, so the novel protocol provides a flexible method of supporting multi-speed clients which is still sensitive to clients that have not implemented any functionality to negotiate the speed.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
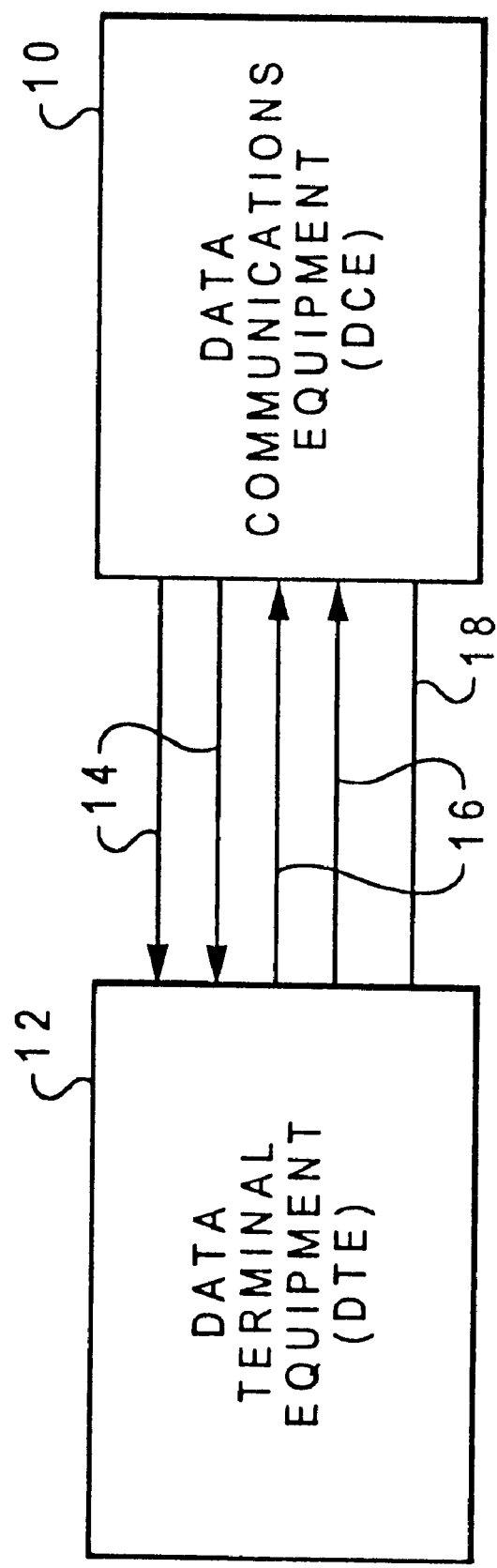
FIG. 1 is a block diagram of a client-server interface constructed in accordance with the present invention.

With reference now to the figures, and in particular with reference to FIG. 1, there is depicted an interface between data terminal equipment (DTE) 10 and data communications equipment (DCE) 12. DTE 10 may be a server such as an IBM AS/400 having a multi-function input/output processor (MFIOP), modified as described below to support multiple-speed DCEs, and DCE 12 may be a client such as a personal computer (PC) or network computer (NC) acting as the system console. The interface includes several lines 14 which allow signals to be passed from DTE 10 to DCE 12, several lines 16 which allow signals to be passed from DCE 12 to DTE 10, and a common ground line 18. The interface can be provided by, e.g., an RS-232 connection. Lines 14 and 16 carry appropriate signals to allow the establishment and maintenance of communications between DTE 10 and DCE 12, and can include timing lines, status lines, and data transmit and receive lines. These lines provide conventional functionality such as framing, error detection, error recovery, polling, addressing, and flow control.

DTE 10 initially receives data at a default line speed, e.g., 9600 bits per second (bps), but it automatically adjusts the line speed to optimize the connection with DCE 12. If DCE 12 desires to communicate at a speed higher than 9600 bps, then it sends to DTE 10 a specially formatted SDLC (synchronous data link control) frame at the initial line speed of 9600 bps, indicating a requested speed, e.g., 33.6 kilobits per second (kbps). The specially formatted frame can be sent according to, e.g., the V.25Bis format (which is also used for automatic calling and answering equipment on the public switch telephone network). DTE 10 then can send an SDLC response frame back informing DCE 12 at what speed DTE 10 can run; the speed indicated in the response will be the smaller of the requested speed or a maximum speed, e.g., 28.8 kbps, which is a factor of the type of hardware being used in DTE 10.

Once the attached device sees the response frame, it has the choice of either accepting this new baud rate or continuing to use the current (9600 bps) connection. If the client decides to communicate at the accepted speed (the lower of the requested or maximum speeds), it drops the current connection and establishes another connection at the accepted speed, and sends another SDLC frame at the accepted speed. The server then sends an SDLC response frame at the accepted speed. If neither the client nor the server receives a valid SDLC frame within a predetermined time (e.g., 10 seconds) at the accepted speed, then the connection is dropped. Both sides can implement a timer once they change to the new negotiated speed. Once each side has received a valid SDLC frame from the other side, it cancels the timer, and continues to transfer data at the new negotiated speed. If neither side receives data before the timer is activated, then it can break the connection by dropping its control signals. The other side will see the change in control signals, realize the first side broke the connection, and either attempt to re-negotiate the speed or choose to use the current default of 9600 bps. For example, DTE 10 or DCE 12 can count the number of attempts that have been made and force the interface to use the default speed if a certain number of attempts have occurred. Alternatively, a different accepted speed can be tried (e.g., by using a different maximum speed, such as 14.4 kbps).

Figure 2:
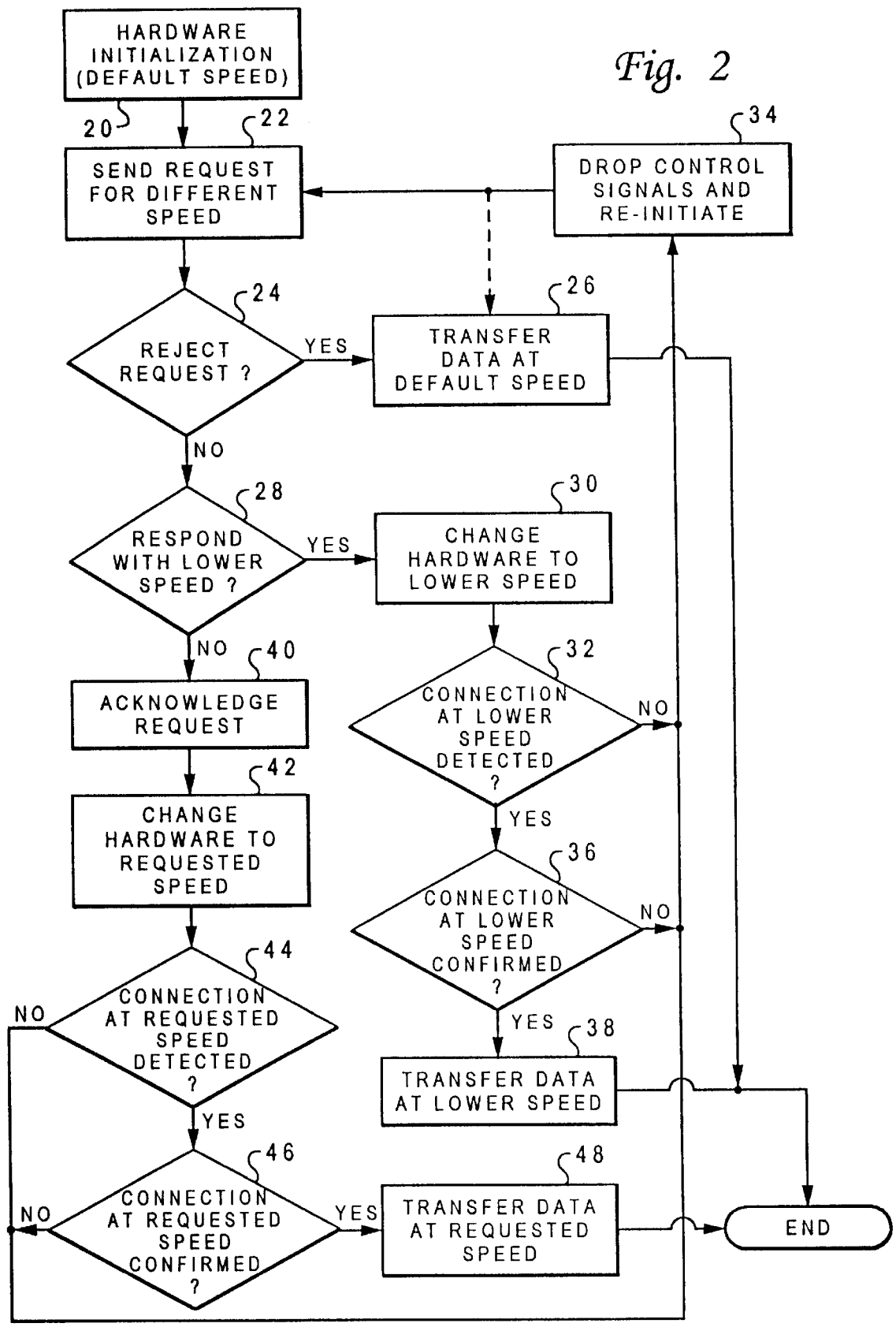
FIG. 2 is a flowchart depicting the method of automatically adjusting line speed according to the present invention.

The invention may further be understood with reference to the flow chart of FIG. 2. When each device (DTE 10 and DCE 12) first powers up, it initializes its communications hardware using the default speed (20). DCE 12 then sends the request for a different communications speed (22). The request may be rejected (24) if, for example, DTE 10 has been placed in a fixed-speed mode to force all communications to be at the default speed. In this case, data would just be transmitted at the default speed (26). If the request is not rejected, the requested speed is compared with the predetermined (maximum) speed to see if DTE 10 should respond with a lower speed than the requested speed. If so, the lower speed is sent as a response (28) and each device resets its communication hardware to the accepted speed (30). DTE 10 waits for a new SDLC frame at the accepted speed (32) and, if the frame is not detected, the control signals are dropped and communications re-initiated (34). If the frame from DCE 12 is received by DTE 10, then DTE 10 responds with a confirmation SDLC frame at the accepted speed, and DCE 12 waits for this confirmation frame. If the confirmation frame is not received (36), the connected is dropped (34), but if the confirmation frame is received, then data is transferred at the accepted speed (38).

Returning to block 28, if DTE 10 determines that the speed requested by DCE 12 is feasible (i.e., equal to or less than the maximum speed), then DTE 10 sends an acknowledgement response (40). Each device then resets its communication hardware to the requested speed (42). DTE 10 waits for a new SDLC frame at the requested speed (44) and, if the frame is not detected, the control signals are dropped and communications re-initiated (34). If the frame from DCE 12 is received by DTE 10, then DTE 10 responds with a confirmation SDLC frame at the requested speed, and DCE 12 waits for this confirmation frame. If the confirmation frame is not received (46), the connected is dropped (34), but if the confirmation frame is received, then data is transferred at the requested speed (48).

DTE 10 can easily be made to support clients that have not implemented this automatic adjustment process. If DTE 10 receives a nonconforming packet as the first SDLC frame (such as a NULL XID packet), without receiving a proper request packet, then it assumes that this client will use 9600 bps for this connection. Therefore, the novel protocol provides a flexible method of supporting multi-speed DCEs which is still sensitive to clients that have not implemented any functionality to negotiate the speed.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

I claim:

1. A method of automatically adjusting the line speed for communication between a client and a server, comprising the steps of:

establishing a first connection between the client and the server at a first speed;

sending at the first speed, from the client to the server, a first synchronous data link control (SDLC) frame that identifies a requested speed; and sending at the first speed, from the server to the client, a second SDLC frame in response to the first SDLC frame, the second SDLC frame identifying a second speed, wherein the second speed is the smaller of the requested speed and a predetermined speed.

2. The method of claim 1 comprising the further steps of determining, in the client, whether to communicate at the first speed or the second speed and, if the client determines to communicate at the second speed:

dropping the first connection;

establishing a second connection at the second speed;

sending, from the client to the server, a third SDLC frame at the second speed; and sending, from the server to the client, a fourth SDLC frame in response to the third SDLC frame at the second speed.

3. The method of claim 1 wherein the requested speed is the same as or less than the predetermined speed, and said step of sending the second SDLC frame identifying a second speed sends an acknowledgement of the requested speed.

4. The method of claim 2 comprising the further steps of, if the server does not receive the third SDLC frame within a predetermined time, dropping the second connection and establishing a third connection using the first speed.

5. The method of claim 2 comprising the further steps of, if the client does not receive the fourth SDLC frame within a predetermined time, dropping the second connection and establishing a third connection using the first speed.

6. The method of claim 2 comprising the further steps of, if the server does not receive the third SDLC frame within a predetermined time, dropping the second connection, establishing a third connection using the first speed, and repeating said sending steps.

7. The method of claim 2 comprising the further steps of, if the client does not receive the fourth SDLC frame within a predetermined time, dropping the second connection, establishing a third connection using the first speed, and repeating said sending steps.

8. The method of claim 6 comprising the further step of the server incrementing a counter to indicate the number of connection attempts.

9. A computer system comprising:

a client having data communications means for transmitting, at a first speed, a first synchronous data link control (SDLC) frame that identifies a requested speed;

a server having data terminal equipment means for receiving said first SDLC frame and transmitting a second SDLC frame, at said first speed, said second SDLC frame identifying a second speed, wherein said second speed is the smaller of said requested speed and a predetermined speed, each of said data communications means and data terminal means further being adapted to drop a first connection at said first speed and thereafter establish a second connection at said second speed; and means for interfacing said data communications means with said data terminal means.

10. The computer system of claim 9 wherein:

said data communications means is further adapted to transmit a third SDLC frame at said second speed; and said data terminal means is further adapted to transmit a fourth SDLC frame in response to said third SDLC frame at said second speed.

11. The computer system of claim 9 wherein said requested speed is the same as or less than said predetermined speed, and said data terminal means transmits said second SDLC frame identifying a second speed by sending an acknowledgement.

12. The computer system of claim 10 wherein said data terminal means is further adapted to drop said second connection, if said server does not receive said third SDLC frame within a predetermined time after establishing said second connection, and establish a third connection using said first speed.

13. The computer system of claim 10 wherein said data communications means is further adapted to drop said second connection, if said client does not receive said fourth SDLC frame within a predetermined time after transmitting said third SDLC frame, and establish a third connection using said first speed.

14. The computer system of claim 12 wherein said data terminal means is further adapted to repeat connection attempts at said second speed and increment a counter to indicate the number of connection attempts.

\* \* \* \* \*